United States Patent [19]

Steadings et al.

[11] Patent Number: 5,348,318
[45] Date of Patent: Sep. 20, 1994

[54] CHUCK

[75] Inventors: Stephen W. Steadings; Christopher B. Barton, both of Seneca, S.C.

[73] Assignee: Jacobs Chuck Technology Corporation, Wilmington, Del.

[21] Appl. No.: 106,390

[22] Filed: Aug. 13, 1993

[51] Int. Cl.5 .............................................. B23B 13/12
[52] U.S. Cl. ...................................... 279/62; 279/902
[58] Field of Search ................................. 279/60–65, 279/902

[56] References Cited

U.S. PATENT DOCUMENTS

| | | |
|---|---|---|
| 897,335 | 9/1908 | Almond . |
| 911,012 | 1/1909 | Jacobs . |
| 1,123,541 | 1/1915 | Jacobs . |
| 1,526,328 | 2/1925 | Englund . |
| 2,292,470 | 8/1942 | Östberg . |
| 2,684,856 | 7/1954 | Stoner . |
| 3,589,486 | 6/1971 | Kelch . |
| 3,813,827 | 6/1974 | Bloch . |
| 3,927,892 | 12/1975 | Pradota . |
| 4,252,333 | 2/1981 | Vogel . |
| 4,275,893 | 6/1981 | Bilanceri . |
| 4,305,597 | 12/1981 | McCarty . |
| 4,423,881 | 1/1984 | Whitehead . |
| 4,460,296 | 7/1984 | Sivertson, Jr. . |
| 4,575,108 | 3/1986 | Whitehead . |
| 4,648,608 | 3/1987 | Smith . |
| 4,660,841 | 4/1987 | Chouinard . |
| 4,664,394 | 5/1987 | Theissig et al. . |
| 4,682,918 | 7/1987 | Palm . |
| 4,695,065 | 9/1987 | Komatsu et al. . |
| 4,702,122 | 10/1987 | Richard . |
| 4,817,971 | 4/1989 | Flynn . |
| 4,840,387 | 6/1989 | McCarthy . |
| 4,842,288 | 6/1989 | Ando . |
| 4,951,955 | 8/1990 | Sakamaki . |
| 5,009,439 | 4/1991 | Sakamaki ............................ 279/62 |
| 5,125,673 | 6/1992 | Huff et al. . |
| 5,253,879 | 10/1993 | Huff et al. . |

FOREIGN PATENT DOCUMENTS

| | | |
|---|---|---|
| 3439668A | 4/1986 | Fed. Rep. of Germany . |
| 63-216604 | 9/1988 | Japan . |
| 8903267 | 10/1988 | Japan . |
| 661643 | 11/1951 | United Kingdom . |

OTHER PUBLICATIONS

Yukiwa Products Brochure
Bosch Catalog No. 890,021, Sep., 1990, pp. 15 and 17.

Primary Examiner—Steven C. Bishop
Attorney, Agent, or Firm—Dority & Manning

[57] ABSTRACT

Chuck for use with manual or powered driver having rotatable shaft, the chuck including a bearing thrust ring fixed on the body and a self-contained anti-friction bearing assembly disposed adjacent the thrust ring. The chuck further includes a nut rotatably mounted on the bearing assembly in engagement with the threads on the jaws, and a generally cylindrical front sleeve in driving engagement with the nut and overlying the nose section of the body so that when the front sleeve member is rotated with respect to the body, the jaws will be moved thereby.

17 Claims, 2 Drawing Sheets

CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction with respect to a constrained nut engaging the jaws forces the jaws into gripping relationship with the cylindrical shank of a tool, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

Despite the success of keyless chucks such as set forth in U.S. Pat. No. 5,125,673, varying configurations of keyless chucks are desirable for a variety of applications. Existing bearing arrangements in chucks are designed to take the thrust load of a bearing and to eliminate friction between the nut and the body in the axial direction. These bearings are sometimes caged and have separate top and bottom thrust races. The body or the nut, if hard enough, can serve as the bottom or top thrust race, respectively.

It would be desirable to have a chuck configuration whereby radial as well as axial thread stresses were minimized when the chuck was operated. Further, it would be desirable to have a chuck whereby frictional contact between the chuck body and nut was minimized and further whereby the nut was maintained as centrally as possible during tightening to provide for more even loading of the individual jaws. It would also be desirable to have a keyless chuck that requires fewer components or lower manufacturing cost.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a keyless chuck that allows for efficient tightening of the nut on the jaws during operation.

It is another object of the present invention to provide a keyless chuck that has a minimum number of individual components that must be assembled.

Another object of the present invention is to provide a chuck that minimizes frictional contact between the chuck body and the nut.

A further object of the present invention is to provide a chuck which minimizes both axial and radial stresses during operation.

Yet another object of the present invention is to provide a chuck with an improved mechanism for maintaining the centrality of the nut during tightening.

These and other objects are achieved by providing a chuck for use with a manual or power driver having a rotatable drive shaft, the chuck comprising a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck further includes a bearing thrust ring fixed on the body member and a self-contained anti-friction bearing assembly disposed adjacent the thrust ring. The chuck also includes a nut rotatably mounted on the bearing assembly and in engagement with the threads on the jaws, and a generally cylindrical front sleeve member in driving engagement with the nut and overlying the nose section of the body member whereby when the front sleeve member is rotated with respect to the body member, the jaws will be moved thereby.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
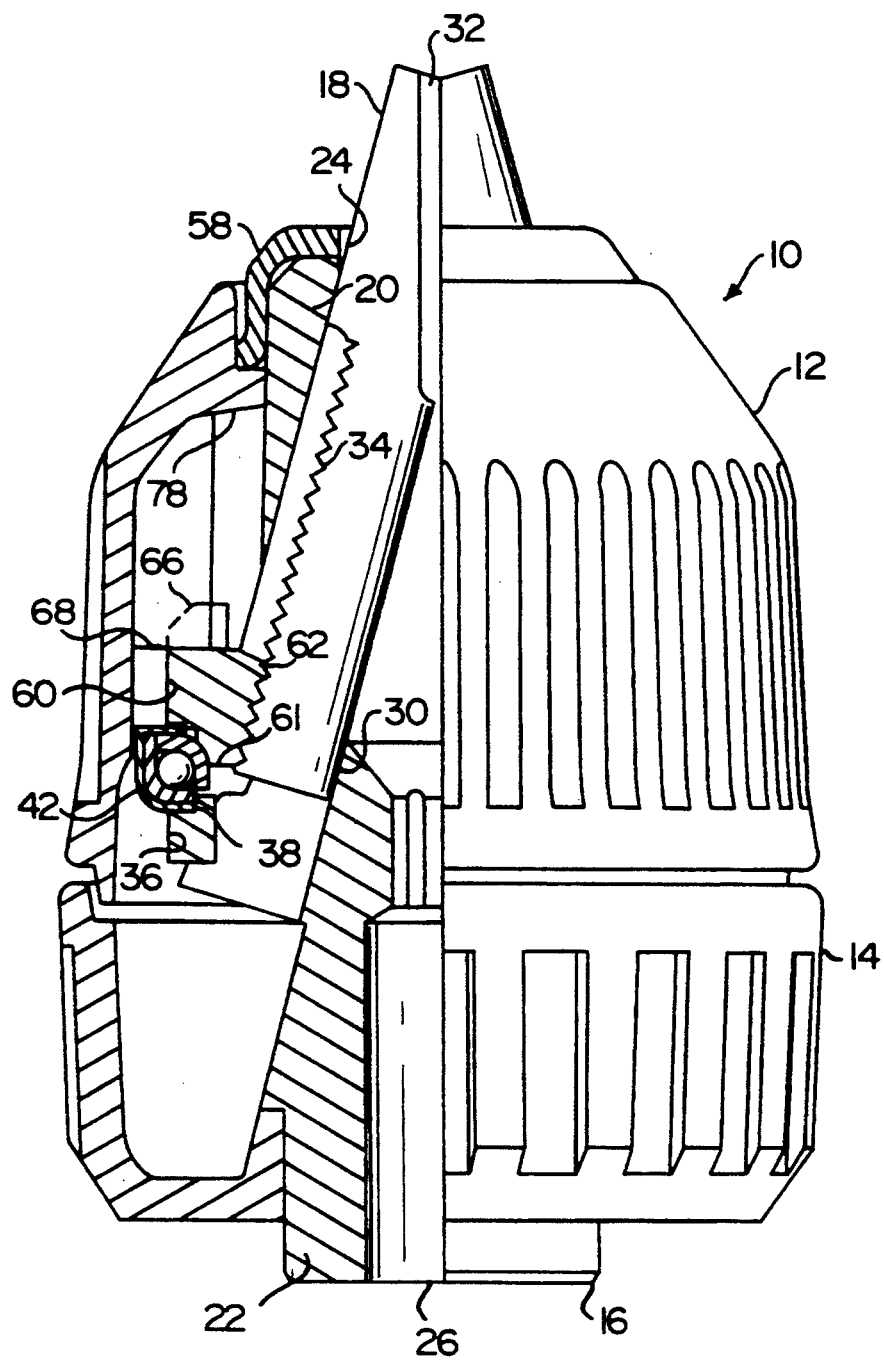
FIG. 1 is a longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, a chuck 10 in accordance with the present invention is illustrated. Chuck 10 includes a front sleeve member 12, an optional rear sleeve member 14, a body member 16 and jaws 18. Referring to FIGS.

1 and 2, body member 16 is generally cylindrical in shape and comprises a nose or forward section 20 and a tail or rearward section 22. An axial bore 24 is formed in the nose section 20 of the body member 16. Axial bore 24 is somewhat larger than the largest tool shank that the chuck is designed to accommodate. A threaded bore 26 is formed in tail section 22 of body 16 and is of a standard size to mate with the drive shaft of a powered or hand driver (not shown). The bores 24, 26 may communicate at the central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Referring to FIG. 1, three jaws 18 are employed and each jaw 18 is separated from the adjacent jaw by an arc of approximately 120 degrees. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of the chuck body 16 and threads 34 on its opposite or outer surface. Threads 34 of any suitable type and pitch may be utilized within the scope of the present invention as would be readily apparent to one skilled in the art.

Figure 2:
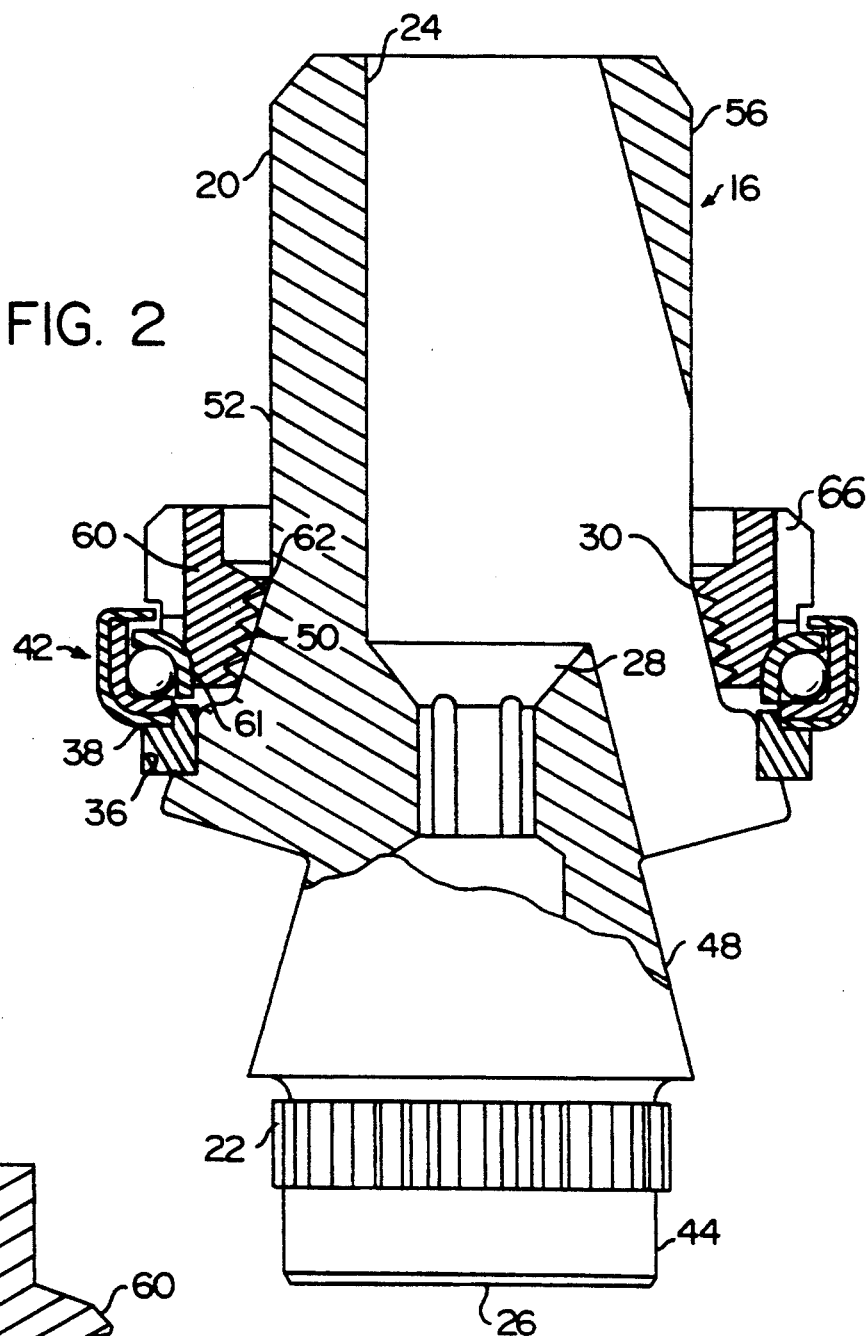
FIG. 2 is a cross-sectional view of the chuck body and certain other parts illustrated in FIG. 1.

As illustrated in FIGS. 1 and 2, body member 16 includes a thrust ring member 36 which, in a preferred embodiment, is integral therewith. Although not preferred, thrust ring member 36 may be a separate component from the body member. Thrust ring member 36 includes a ledge portion 38. Ledge portion 38 is adapted for engagement with the shroud or outer race of a self-contained anti-friction bearing assembly 42 as will be described in more detail below. Thrust ring member 36 includes a plurality of jaw guideways 50 formed around the circumference to permit retraction of the jaws 18 therethrough.

Referring to FIG. 2, body member 16 includes a rear cylindrical portion 44 with a knurled surface 46 thereon for receipt of optional rear sleeve 14 (FIG. 1) to be pressed thereon if so desired. Body 16 further includes a first tapered portion 48 extending from rear cylindrical portion 44 to the region of thrust ring 36. A second tapered portion 50 extends from the area of thrust ring 36 to a front cylindrical portion 52. A nose portion 56 is adapted to receive a nosepiece 58 for maintaining the front sleeve in driving engagement with a nut as will be set forth in more detail below. Alternatively, a snap ring or the like could be utilized to maintain the front sleeve in place or the front sleeve could be pressed on or otherwise secured to the nut.

The present invention further includes a nut 60 which, in a preferred embodiment, is a one piece nut and which includes threads 62 for mating with threads 34 on jaws 18 whereby when nut 60 is rotated with respect to body 16, the jaws will be advanced or retracted. Nut 60 may include drive slots 66 for mating with drive ribs 68 on front sleeve 12 so that when front sleeve 12 is rotated, nut 60 will rotate therewith and move jaws 18 as set forth above.

Nut 60 further includes an arcuate seating surface 61 for mating with an arcuate seating portion on the bearing assembly 42 as will be described in more detail below.

Figure 3:
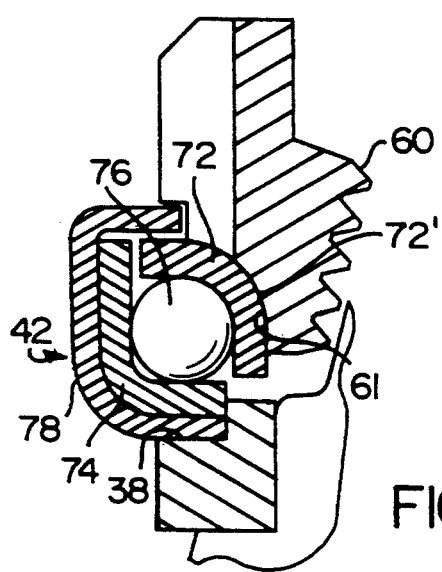
FIG. 3 is a detailed enlarged view of a bearing and nut arrangement in accordance with an embodiment of the present invention.

Referring to FIGS. 1-3, self-contained bearing assembly 42 is adapted to be placed between thrust ring 36 and seating surface 61 of nut 60. Self-contained bearing assembly 42 includes an inner race 72, an outer race 74 and bearing elements 76 maintained therebetween. In a preferred embodiment, bearing elements 76 are ball bearings. Self-contained bearing assembly 42 may further include a shroud 78 surrounding the inner and outer races 72, 74 for maintaining the bearing assembly as a self-contained component. Inner race 72 includes an arcuate surface 72' that is dimensioned and configured to mate with arcuate seating surface 61 on nut 60. Nut 60 is received for support on inner race 72 and is not in frictional contact with body 16 as in prior art devices. Such mating relationship assists in alignment and minimization of both axial and radial stresses when the chuck is operated, as well as minimizing or eliminating frictional contact or rubbing between nut 60 and body 16. Further, such a relationship assists in maintaining the nut centered during tightening so as to provide more even tightening of the chuck and reducing runout. This arrangement also maintains optimum thread engagement with each jaw, further increasing efficiency and reducing stress in both jaw and nut threads. In a preferred embodiment, self-contained bearing assembly 42 is a radial thrust bearing.

In a preferred embodiment as set forth above, front sleeve member 12 is adapted to be loosely fitted over nose section 20 of chuck 10. Multiple drive ribs 68 of front sleeve 12 engage drive slots 66 of nut 60 so that front sleeve 12 and nut 60 will be operatively connected, i.e., when front sleeve 12 is rotated, nut 60 will rotate therewith. Front sleeve 12 may include an annular ledge portion 78. A nosepiece 58 is dimensioned and adapted to be pressed onto nose portion 56 to maintain front sleeve 12 on chuck 10. It should be appreciated that nosepiece 58 could also be secured to body 16 by snap fitting, threading or the like. Nosepiece 58 is exposed when the chuck is assembled and, in one embodiment, may be coated with a non-ferrous metallic coating to prevent rust and to enhance its appearance. Examples of suitable coatings include zinc or nickel, however, it should be appreciated that any suitable coating could be utilized.

Nosepiece 58 serves to maintain front sleeve member 12 in position on chuck 10 and in driving engagement with nut 60. In addition, nosepiece 58 serves the dual purpose of providing an aesthetically pleasing cover for nose portion 56 that will resist rust. This provides the advantage of an aesthetically pleasing appearance without the necessity to coat the entire body member 16. If desired, the rear sleeve member 14 may be omitted and the front sleeve member 12 extended to the tail end of body 16. This alternative is feasible when a spindle lock or the like is provided on the driver or when the driver is used to tighten or loosen the jaws.

The circumferential surface of the front sleeve member 12 may be knurled or may be provided with longitudinal ribs or other protrusions to enable the operator to grip it securely. In like manner, the circumferential surface of the rear sleeve member 14, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

Further, while a nosepiece and driving slot arrangement is illustrated, it should be appreciated that any method of operative connection between the front sleeve and the nut could be utilized within the scope of the present invention.

It will be appreciated that rear sleeve member 14 is fixed to body member 16 while front sleeve member 12 is operatively associated with nut 36 and secured to body member 16 for relative rotation therewith. Relative movement of the front and rear sleeve members, 12 and 14, due to the interaction between threads 34 on jaws 18 and threads 62 on nut 60 causes jaws 18 to be advanced or retracted, depending upon the direction of relative movement.

While the above description is set forth with respect to a keyless chuck, it should be appreciated that the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a bearing thrust ring fixed on said body member;
   d) a self-contained anti-friction bearing assembly disposed adjacent said thrust ring, said bearing assembly having an inner race, an outer race and bearing elements cooperating together;
   e) a nut rotatably mounted on said bearing assembly and in engagement with said threads on said jaws; and
   f) a generally cylindrical front sleeve member in driving engagement with said nut and overlying said nose section of said body member whereby when said front sleeve member is rotated with respect to said body member, said jaws will be moved thereby.

2. A chuck for use with a manual or powered driver as stated in claim 1, wherein said nut is supported for rotation on said inner race.

3. A chuck for use with a manual or powered driver as stated in claim 1, wherein said thrust ring includes a ledge portion and wherein said self-contained bearing assembly is received on said ledge portion.

4. A chuck for use with a manual or powered driver as stated in claim 1, wherein said thrust ring is unitary with said body member.

5. A chuck for use with a manual or powered driver as stated in claim 1, wherein said nut is a one piece nut.

6. A chuck for use with a manual or powered driver as stated in claim 1 and further including a rear sleeve member secured to the tail section of said body member.

7. A chuck for use with a manual or powered driver as stated in claim 1, wherein said nut includes drive slots for receipt of drive ribs on the front sleeve member.

8. A chuck for use with a manual or powered driver as stated in claim 1, wherein said bearing elements are ball bearings.

9. A chuck for use with a manual or powered driver as stated in claim 2, wherein said thrust ring includes a ledge portion and wherein said self-contained bearing assembly is received on said ledge portion.

10. A chuck for use with a manual or powered driver as stated in claim 2, wherein said thrust ring is unitary with said body member.

11. A chuck for use with a manual or powered driver as stated in claim 2, wherein said nut is a one piece nut.

12. A chuck for use with a manual or powered driver as stated in claim 2 and further including a rear sleeve member secured to the tail section of said body member.

13. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a bearing thrust ring fixed on said body member;
   d) a self-contained anti-friction bearing assembly disposed adjacent said thrust ring, said self-contained bearing assembly including an inner race and an outer race with bearing elements maintained therebetween, and further wherein said self-contained bearing assembly includes a shroud at least partially surrounding said inner and outer races for maintaining said bearing assembly self contained;
   e) a nut rotatably mounted on said bearing assembly and in engagement with said threads on said jaws, said nut supported for rotation on said inner race; and
   f) a generally cylindrical front sleeve member in driving engagement with said nut and overlying said nose section of said body member whereby when said front sleeve member is rotated with respect to said body member, said jaws will be moved thereby.

14. A chuck for use with a manual or powered driver having a rotatable drive shafts, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof and threads formed on the opposite side thereof;
c) a bearing thrust ring fixed on said body member;
d) a self-contained anti-friction bearing assembly disposed adjacent said thrust ring, said self-contained bearing assembly including an inner race and an outer race with bearing elements maintained therebetween;
e) a nut rotatably mounted on said bearing assembly and in engagement with said threads on said jaws, said nut is supported for rotation on said inner race and includes an arcuate seating surface for mating with an arcuate seating portion of said inner race.

15. A chuck for use with a manual or powered driver having a rotatable drive shaft, said chuck comprising:
    a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
    b) a plurality of jaws slidably positioned in each of said angularly disposed passageways, each of said jaws having a jaw face formed on one side thereof and threads formed on the opposite side thereof;
    c) a bearing thrust ring fixed on said body member;
    d) a self-contained anti-friction bearing assembly disposed adjacent said thrust ring, wherein said bearing assembly is a radial thrust bearing;
    a nut rotatably mounted on said bearing assembly and in engagement with said threads on said jaws; and
    f) a generally cylindrical front sleeve member in driving engagement with said nut and overlying said nose section of said body member whereby when said front sleeve member is rotated with respect to said body member, said jaws will be moved thereby.

16. A chuck for use with a manual or powered driver having a rotatable drive shaft, said chuck comprising:
    a) generally cylindrical body member having a nose section and a tail section, said tail section axial bore formed therein to mate with said drive shaft of said driver and said nose section having an axial bore formed therein and a plurality of angularly disposed passageways formed therethrough and intersecting said axial bore;
    b) a plurality of jaws slidably positioned in each of said angularly disposed passageways, each of said jaws having a jaw face formed on one side thereof and threads formed on the opposite side thereof;
    c) bearing thrust ring fixed on said body member;
    d) a self-contained anti-friction bearing assembly disposed adjacent said thrust ring;
    e) a nut rotatably mounted on said bearing assembly and in engagement with said threads on said jaws; and
    f) a generally cylindrical front sleeve member in driving engagement with said nut and overlying said nose section of said body member, said front sleeve member being maintained on said body member and in engagement with said nut by a rust resistant nosepiece whereby when said front sleeve member is rotated with respect to said body member, said jaws will be moved thereby.

17. A chuck for use with a manual or powered driver having a rotatable drive shaft, said chuck comprising:
    a) a generally cylindrical body member having a nose section and a tail section, said tail section having a nose axial bore formed therein to mate with said drive shaft of said driver and said nose section having an axial bore formed therein and a plurality of angularly disposed passageways formed therethrough and intersecting said axial bore;
    b) a plurality of jaws slidably positioned in each of said angularly disposed passageways, each of said jaws having a jaw face formed on one side thereof and threads formed on the opposite side thereof;
    c) a bearing thrust ring fixed on said body member;
    d) a self-contained anti-friction bearing assembly disposed adjacent said thrust ring, said bearing assembly including an inner race and an outer race with bearing elements maintained therebetween, wherein said bearing assembly is a radial thrust bearing;
    e) a nut rotatably mounted on said bearing assembly and in engagement with said threads on said being supported for rotation on said inner race; and
    f) a generally cylindrical front sleeve member in driving engagement with said nut and overlying said nose section of said body member whereby when said front sleeve member is rotated with respect to said body member, said jaws will be moved thereby.

* * * * *

UNITED STATES PATENT AND TRADEMARK OFFICE
CERTIFICATE OF CORRECTION

PATENT NO. : 5,348,318
DATED : September 20, 1994
INVENTOR(S) : Steadings et al.

It is certified that error appears in the above-identified patent and that said Letters Patent is hereby corrected as shown below:

In claim 14, Column 6, line 61, please delete the letter "s" after the word "shaft".

In claim 15, Column 7, line 35, insert "e)" at the beginning of the line.

In claim 16, Column 7, line 46, please insert --having an-- after the phrase "said tail section".

In claim 17, Column 8, line 25, please delete the word "nose"; and in Column 8, line 42, please insert --jaws, said nut-- between the words "said" and "being".

In claim 17, column 8, line 24, "a" should read --an--.

Signed and Sealed this

Twenty-fourth Day of January, 1995

*Attest:*

BRUCE LEHMAN

*Attesting Officer*   *Commissioner of Patents and Trademarks*